United States Patent [19]
Shuler

[11] 3,933,043
[45] Jan. 20, 1976

[54] AIR QUALITY SENSING APPARATUS
[75] Inventor: Bernard R. Shuler, Louisville, Ky.
[73] Assignee: American Air Filter Company, Inc., Louisville, Ky.
[22] Filed: Sept. 25, 1974
[21] Appl. No.: 509,284

[52] U.S. Cl. ............................. 73/336; 236/44 R
[51] Int. Cl.² ........................................ G01W 1/02
[58] Field of Search ....... 73/336, 357; 236/49, 44 R

[56] References Cited
UNITED STATES PATENTS
3,743,180   7/1973   Perkins et al. .................... 236/49

Primary Examiner—Donald O. Woodiel
Attorney, Agent, or Firm—Jon C. Winger

[57] ABSTRACT

An air quality sensing apparatus for measuring, monitoring and controlling temperature and air relative humidity of air interior a room, including an apertured housing enclosing temperature and humidity sensing devices and an asperating tube fluidly interconnecting the interior of the housing and a return air system.

5 Claims, 3 Drawing Figures

U.S. Patent   Jan. 20, 1976   3,933,043
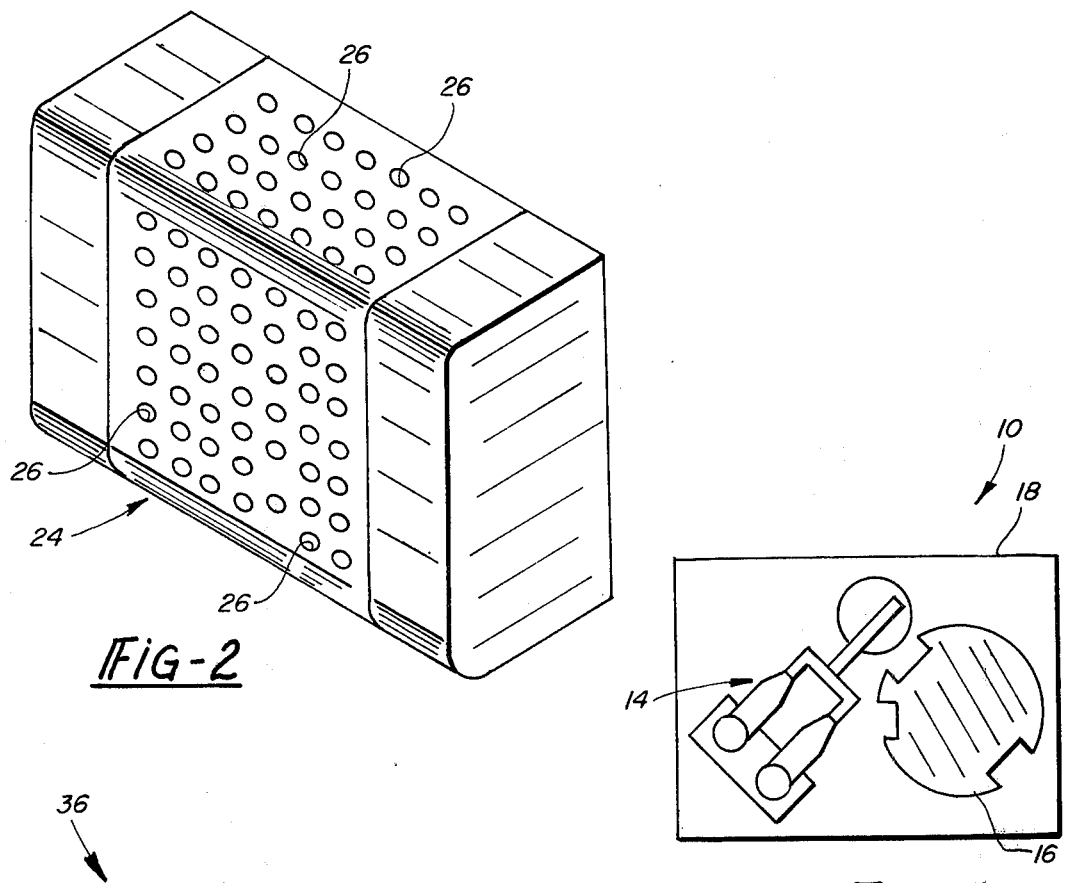
FIG-2
FIG-3
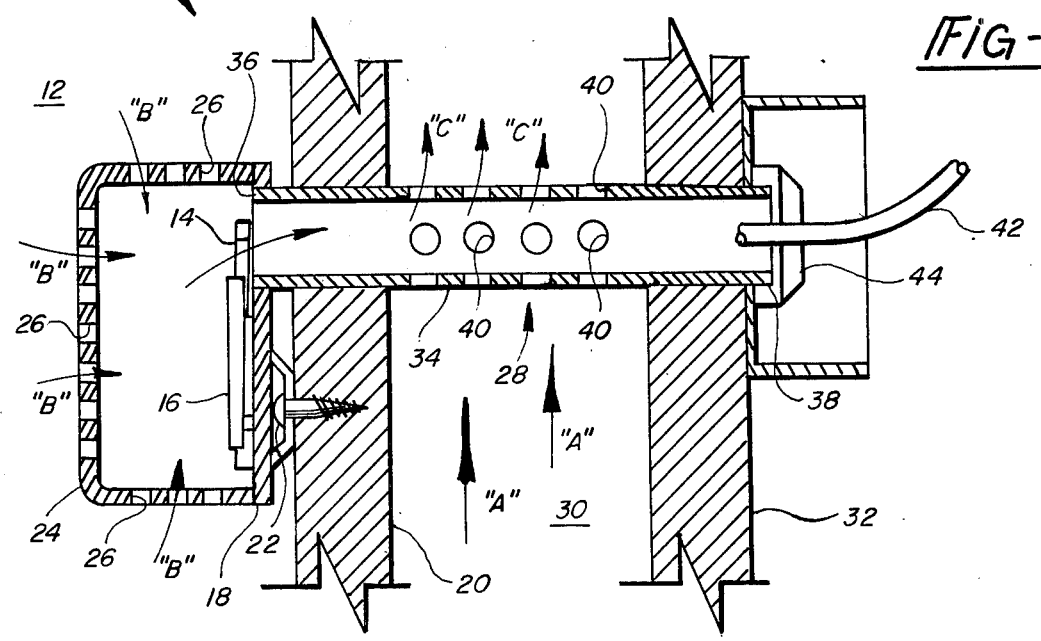
FIG-1

3,933,043

AIR QUALITY SENSING APPARATUS

BACKGROUND OF THE INVENTION

The present invention relates to devices for sensing the quality of air, and more particularly to devices for determining the temperature and relative humidity of air in a room.

Air temperature and humidity sensing devices are usually located on a wall of a room, or in a return air system of a recirculating-type air conditioning system which services the room. Heretofore known wall mounted devices are capable of only slowly measuring the conditions of the air local to the device, usually only within eight (8) feet thereof because the air in the room is somewhat stagnant and not circulated past the device. Return air duct-mounted devices provide better temperature averaging measurements of the room air conditions, but because of the lag time required for the room air to reach the return duct, accurate room air temperature and relative humidity measurements and, therefore, accurate temperature and humidity control are precluded.

SUMMARY OF THE INVENTION

The present invention recognizes these difficulties of the past and recognizes a need for a relatively inexpensive air and relative humidity sensing device which is capable of quickly measuring the temperature of a broad region of room air and measuring the relative humidity of the air in a room with a minimum of lag time. The present invention then provides an air quality measuring apparatus which satisfies the above-mentioned needs including a sensor housing which constantly draws room air over the sensing instruments located therein.

More particularly, the present invention provides an air quality sensing apparatus for determining predetermined qualities of air within a room having a return air system, comprising: a sensor housing disposed within the room and adapted to contain air quality sensing means, the housing having aperture means to provide communication between the interior of the room and the interior of the housing; and siphon means operatively interconnecting the interior of the sensor housing and the return air system of the room whereby air flowing in the return air system of the room creates a siphonage of air from the interior of the housing causing air to flow from the room through the apertures into the interior of the housing and over the sensing devices.

DESCRIPTION OF THE DRAWINGS

A better understanding of the invention can be had by reference to the accompanying drawings in which like numerals refer to like parts throughout the several views and in which:

FIG. 1 is a cross-sectional view of the present invention connected to a wall of an enclosure;

FIG. 2 is a perspective view of a housing of the present invention; and,

FIG. 3 is a front view of the present invention with the housing removed.

DETAILED DESCRIPTION OF THE PREFERRED EMBODIMENT

The Figures illustrate an air quality sensing apparatus, generally denoted by the numeral 10, for measuring the quality, such as temperature and relative humidity, of air within an enclosure, such as a room 12. The apparatus 10 comprises air quality sensing means, such as an air temperature measuring instrument 14 and a relative humidity measuring instrument 16 (see FIG. 3), various embodiments or details of which are well known in the art and therefore only disclosed schematically here. The instruments 14 and 16 are mounted to a mounting plate 18 which is adapted to be connected to an interior wall 20 of the room 12 by, for example, a screw 22. A sensor housing 24 having a plurality of apertures 26 is removably connected to the mounting plate and encloses the air quality measuring instruments 14 and 16 (see FIGS. 1 and 2).

With particular reference to FIG. 1, the apparatus 10 further includes siphon means 28 operatively interconnecting the interior of the sensor housing 24 and a room air return passage 30. The return air passage 30 is illustrated as an air space defined between the interior wall 20 and an exterior wall 32 of the room 12. The siphon means 28 consists of an asperating tube 34 in the form of a cylindrical duct open at one end 36 to the interior of housing 24, closed at its other end 38 and having a plurality of apertures 40 formed in its wall. The tube 34 is disposed within the return air passage 30 such that the apertures 40 are exposed to the room air flowing in the air return passage 30.

The measuring instruments 14 and 16 electrically or pneumatically relay temperature and humidity data to air quality modifying means, such as a furnace, air conditioner and the like via appropriate controls (not shown) by means of electric or pneumatic control circuitry 42 routed through the tube 34, the tube end 38 being fluidly sealed around the circuitry 42 by, for example, a rubber gromet 44.

The operation of the apparatus 10 is best described with reference to FIG. 1. Return air, denoted by arrows "A", flowing in the return air system 30 flows past the tube 34 in route from the room 12 to the air quality modifying means (not shown) producing low pressure zones at the apertures 40, thus, creating a siphonage interior the tube 34 and housing 24. The siphonage continuously draws room air into the housing 12 through the apertures 26, see arrows "B", and over the measuring instruments 14 and 16. The air temperature and humidity measuring instruments 14 and 16 make their respective measurements and transmit an electric or pneumatic control signal to the appropriate control device of the air quality modifying means by means of the control circuitry 42. The measured room air siphoned into the tube 34 is exhausted into the return air passage 30 through the apertures 40 in the tube 34 as denoted by arrows "C".

By continuously drawing room air, the apparatus 10 quickly measures a more representative sample of air within the room than is measured by heretofore known air temperature and humidity measuring devices. In addition, because the present invention does not use a complicated mechanism to draw room air it is inexpensive to manufacture and maintain.

The foregoing detailed description is given primarily for clearness of understanding and no unnecessary limitations should be understood therefrom, for modifications will be obvious to those skilled in the art upon reading this disclosure and may be made without departing from the spirit of the invention or the scope of the appended claims.

What is claimed is:

1. An air quality sensing apparatus for determining predetermined qualities of air within a room having a return air system, comprising:

a sensor housing disposed within the room and adapted to contain air quality sensing means, said housing having a plurality of aperture means to provide fluid communication between the interior of the room and the interior of said housing; and, siphon means comprising a conduit open to the interior of said housing, said conduit having a plurality of apertures formed in its wall and said apertures in the wall of said conduit being disposed in the return air stream such that return air flowing in the return air system flows past said apertures creating low air pressure areas at said apertures in the wall of said conduit to draw air from the interior of said housing through said conduit and hence from the interior of the room into the interior of said housing.

2. The apparatus defined in claim 1, wherein said conduit is generally cylindrical tube having one of its ends open to the interior of said housing and closed at its opposite end.

3. The apparatus defined in claim 2, wherein said tube is adapted to receive electrical circuitry operatively interconnecting the air quality sensing means and means for modifying the quality of the air interior the room.

4. The apparatus defined in claim 2, wherein said tube is adapted to receive pneumatic circuitry operatively interconnecting the air quality sensing means and means for modifying the quality of the air interior the room.

5. The apparatus defined in claim 1, wherein said sensor housing is attached to a wall of said room interior thereto.

* * * * *